United States Patent
Yamaguchi et al.

[11] Patent Number: 6,063,886
[45] Date of Patent: May 16, 2000

[54] CYCLOOLEFIN COPOLYMERS AND USES THEREOF

[75] Inventors: Masayoshi Yamaguchi; Kazuyuki Takimoto, both of Kuga-gun, Japan

[73] Assignees: Mitsui Chemicals, Tokyo, Japan; Hoechst Aktiengesellschaft, Frankfurt am Main, Germany

[21] Appl. No.: 09/059,558

[22] Filed: Apr. 14, 1998

[30] Foreign Application Priority Data

Apr. 14, 1997 [JP] Japan ................................ 9-095749

[51] Int. Cl.$^7$ .......................... C08F 232/08; C08F 232/04
[52] U.S. Cl. .......................... 526/282; 526/281; 526/308; 526/347; 526/347.1; 526/348; 526/943
[58] Field of Search ..................... 526/281, 943, 526/282, 308, 347, 347.1, 348

[56] References Cited

U.S. PATENT DOCUMENTS

| | | | |
|---|---|---|---|
| 4,252,421 | 2/1981 | Foley, Jr. ................................ | 351/162 |
| 4,990,640 | 2/1991 | Tsutsui et al. . | |
| 5,049,633 | 9/1991 | Sasaki ..................... | 526/281 |
| 5,155,080 | 10/1992 | Elder et al. . | |
| 5,164,469 | 11/1992 | Goto ....................... | 526/281 |
| 5,225,500 | 7/1993 | Elder et al. . | |
| 5,270,393 | 12/1993 | Sagane ..................... | 525/210 |
| 5,321,106 | 6/1994 | LaPointe . | |
| 5,387,568 | 2/1995 | Ewen et al. . | |
| 5,434,707 | 7/1995 | Dalzell ..................... | 359/485 |
| 5,498,677 | 3/1996 | Weller ..................... | 526/133 |
| 5,559,199 | 9/1996 | Abe et al. . | |
| 5,760,139 | 6/1998 | Lee ......................... | 525/200 |
| 5,872,201 | 2/1999 | Cheung .................... | 526/282 |

FOREIGN PATENT DOCUMENTS

| | | |
|---|---|---|
| 0426638 | 5/1991 | European Pat. Off. . |
| 0427697 | 5/1991 | European Pat. Off. . |
| 0608903 | 8/1994 | European Pat. Off. . |
| 0678530 | 10/1995 | European Pat. Off. . |
| 0719806 | 7/1996 | European Pat. Off. . |
| 8805792 | 8/1988 | WIPO . |
| 8805793 | 8/1988 | WIPO . |
| WO9635730 | 11/1996 | WIPO . |

*Primary Examiner*—Fred Zitomer

[57] ABSTRACT

Disclosed is a cycloolefin copolymer which is obtained from (A) a straight-chain or branched α-olefin of 2 to 20 carbon atoms, (B) a specific cycloolefin and (C) an aromatic vinyl compound and has an intrinsic viscosity [η] of 0.1 to 10 dl/g, wherein the content of constituent units derived from the cycloolefin (B) and the content of constituent units derived from the aromatic vinyl compound (C) satisfy a specific relation. The cycloolefin copolymer has high heat resistance, low moisture absorption and small birefringence.

3 Claims, No Drawings

CYCLOOLEFIN COPOLYMERS AND USES THEREOF

FIELD OF THE INVENTION

The present invention relates to cycloolefin copolymers and their uses. More particularly, the invention relates to cycloolefin copolymers having excellent optical properties and to molded articles using the copolymers, particularly molded articles for optics.

BACKGROUND OF THE INVENTION

In recent years, plastics have been used for optical materials, for example, lenses such as spectacle lenses, f·θ lenses and pick-up lenses, prism, optical fibers and substrates of optical recording media or magneto-optical recording media. The plastics used for these optical materials are desired to have high transparency, good dimensional stability, high heat resistance and small birefringence. The optical materials are generally produced by injection molding, but the injection molding process includes high-speed flowing and high-speed cooling and thereby brings about orientation of resin molecules. As a result, molded articles having large birefringence are apt to be produced. Accordingly, there has been desired development of resins from which molded articles having not only excellent heat resistance and transparency but also small birefringence can be produced.

OBJECT OF THE INVENTION

The present invention has been made under such circumstances as mentioned above, and it is an object of the invention to provide a cycloolefin copolymer from which molded articles having high heat resistance, high transparency and small birefringence can be produced and to provide uses of the copolymer.

SUMMARY OF THE INVENTION

The cycloolefin copolymer according to the present invention is a cycloolefin copolymer obtained from:

(A) a straight-chain or branched α-olefin of 2 to 20 carbon atoms, (B) a cycloolefin represented by the following formula (I) or (II), and (C) an aromatic vinyl compound;

Formula (I)

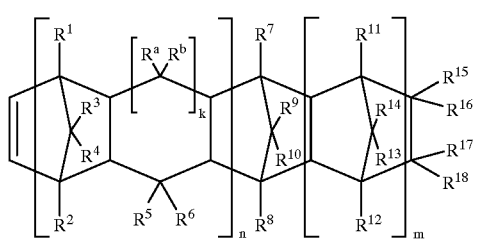

(I)

wherein n is 0 or 1; m is 0 or a positive integer; k is 0 or 1; $R^1$ to $R^{18}$, $R^a$ and $R^b$ are each independently a hydrogen atom, a halogen atom or a hydrocarbon group; $R^{15}$ to $R^{18}$ may be bonded to each other to form a monocyclic or polycyclic ring which may contain a double bond; and a combination of $R^{15}$ and $R^{16}$ or a combination of $R^{17}$ and $R^{18}$ may form an alkylidene group;

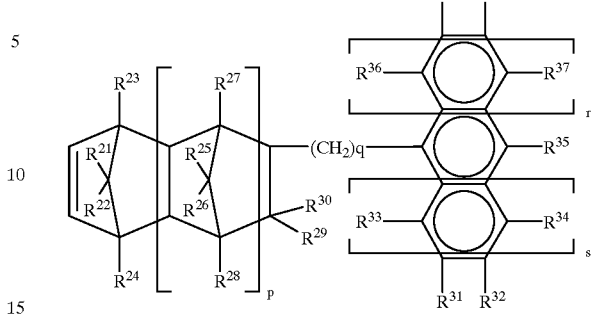

(II)

wherein p and q are each 0 or an integer of 1 or greater; r and s are each 0, 1 or 2; $R^{21}$ to $R^{39}$ are each independently a hydrogen atom, a halogen atom, an aliphatic hydrocarbon group, an alicyclic hydrocarbon group, an aromatic hydrocarbon group or an alkoxy group; a carbon atom to which $R^{29}$ and $R^{30}$ are bonded and either a carbon atom to which $R^{33}$ is bonded or a carbon atom to which $R^{31}$ is bonded may be bonded to each other directly or through an alkylene group of 1 to 3 carbon atoms; and in case of r=s=0, $R^{35}$ and $R^{32}$, or $R^{35}$ and $R^{39}$ may be bonded to each other to form a monocyclic or a polycyclic aromatic ring;

in which the intrinsic viscosity [η] of the cycloolefin copolymer is in the range of 0.1 to 10 dl/g; the content of constituent units derived from the straight-chain or branched α-olefin (A) is in the range of 30 to 89% by mol; the content of constituent units derived from the cycloolefin (B) is in the range of 10 to 70% by mol; the content of constituent units derived from the aromatic vinyl compound (C) is in the range of 0.1 to 35% by mol; and the content (B (% by mol)) of the constituent units derived from the cycloolefin (B) and the content (C (% by mol)) of the constituent units derived from the aromatic vinyl compound (C) satisfy the following relation:

$$0.5 \times B \geq C \geq 0.01 \times B.$$

The cycloolefin copolymer according to the invention preferably has a glass transition temperature (Tg) of 60 to 170° C.

The cycloolefin copolymer according to the invention is favorable as a material of a molded article such as a molded article for optics.

DETAILED DESCRIPTION OF THE INVENTION

The cycloolefin copolymer according to the invention and use of the copolymer are described in detail hereinafter.

The cycloolefin copolymer according to the invention is a copolymer obtained from:

(A) a straight-chain or branched α-olefin of 2 to 20 carbon atoms, (B) a cycloolefin represented by the formula (I) or (II) as described later, and (C) an aromatic vinyl compound.

First, each of the components is described.

(A) Straight-chain or branched α-olefin

Examples of the straight-chain or branched α-olefins (A) include straight-chain α-olefins of 2 to 20 carbon atoms, such as ethylene, propylene, 1-butene, 1-pentene, 1-hexene, 1-octene, 1-decene, 1-dodecene, 1-tetradecene, 1-hexadecene, 1-octadecene and 1-eicosene; and branched α-olefins of 4 to 20 carbon atoms, such as 4-methyl-1-pentene, 3-methyl-1-pentene and 3-methyl-1-butene. Of these, preferable are straight-chain α-olefins of 2 to 4 carbon atoms, and particularly preferable is ethylene. The straight-chain or branched α-olefins (A) can be used singly or in combination of two or more kinds.

(B) Cycloolefin

The cycloolefin (B) is a cycloolefin represented by the following formula (I) or (II).

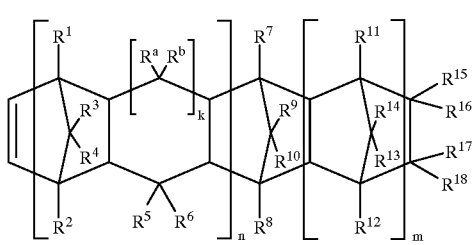
(I)

In the formula (I), n is 0 or 1, m is 0 or a positive integer, and k is 0 or 1. When k is 1, the ring represented by the use of k becomes a 6-membered ring, and when k is 0, the ring represented by the use of k becomes a 5-membered ring.

$R^1$ to $R^{18}$, $R^a$ and $R^b$ are each independently a hydrogen atom, a halogen atom or a hydrocarbon group.

The halogen atom is fluorine, chlorine, bromine or iodine.

The hydrocarbon group is generally an alkyl group of 1 to 20 carbon atoms, a halogenated alkyl group of 1 to 20 carbon atoms, a cycloalkyl group of 3 to 15 carbon atoms or an aromatic hydrocarbon group. Examples of the alkyl groups include methyl, ethyl, propyl, isopropyl, amyl, hexyl, octyl, decyl, dodecyl and octadecyl. These alkyl groups may be substituted with halogen atoms. An example of the cycloalkyl group is cyclohexyl. Examples of the aromatic hydrocarbon groups include phenyl and naphthyl.

In the formula (I), $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$ may be bonded to (may cooperate with) each other to form a monocyclic ring or a polycyclic ring. The thus formed monocyclic ring or polycyclic ring may have a double bond. Examples of the monocyclic rings and the polycyclic rings include the following ones.

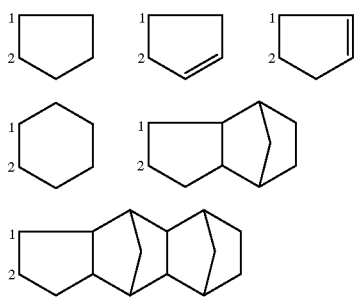

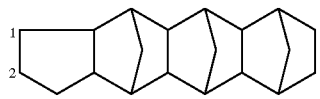

In the above examples, the carbon atoms having numerals 1 and 2 affixed thereto respectively correspond to the carbon atoms to which $R^{15}$ ($R^{16}$) and $R^{17}$ ($R^{18}$) are bonded in the formula (I).

$R^{15}$ and $R^{16}$, or $R^{17}$ and $R^{18}$ may together form an alkylidene group. This alkylidene group generally is an alkylidene group of 2 to 20 carbon atoms. Examples of such alkylidene groups include ethylidene, propylidene and isopropylidene.

Formula (II)

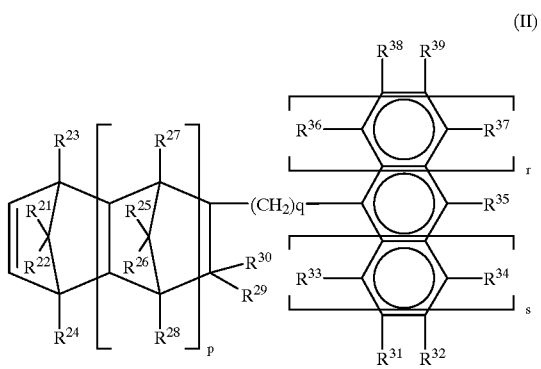
(II)

In the formula (II), p and q are each independently 0 or a positive integer, and r and s are each independently 0, 1 or 2.

$R^{21}$ to $R^{39}$ are each independently a hydrogen atom, a halogen atom, a hydrocarbon group or an alkoxy group.

The halogen atom is the same halogen atom as in the formula (I).

The hydrocarbon group is generally an alkyl group of 1 to 20 carbon atoms, a cycloalkyl group of 3 to 15 carbon atoms or an aromatic hydrocarbon group.

Examples of the alkyl groups include methyl, ethyl, propyl, isopropyl, amyl, hexyl, octyl, decyl, dodecyl and octadecyl. These alkyl groups may be substituted with halogen atoms. An example of the cycloalkyl group is cyclohexyl. Examples of the aromatic hydrocarbon groups include aryl and aralkyl groups, such as phenyl, tolyl, naphthyl, benzyl and phenylethyl.

Examples of the alkoxy groups include methoxy, ethoxy and propoxy.

The carbon atom to which $R^{29}$ and $R^{30}$ are bonded and either the carbon atom to which $R^{33}$ is bonded or the carbon atom to which $R^{31}$ is bonded may be bonded to each other directly or through an alkylene group of 1 to 3 carbon atoms. When the two carbon atoms are bonded to each other through an alkylene group, $R^{29}$ and $R^{33}$, or $R^{30}$ and $R^{31}$ cooperate with each other to form an alkylene group selected from methylene (—$CH_2$—), ethylene (—$CH_2CH_2$—) and propylene (—$CH_2CH_2CH_2$—).

In case of r=s=0, $R^{35}$ and $R^{32}$, or $R^{35}$ and $R^{39}$ may be bonded to each other to form a monocyclic or polycyclic aromatic ring. Examples of the aromatic rings formed by $R^{35}$ and $R^{32}$ in case of r=s=0 are as follows.

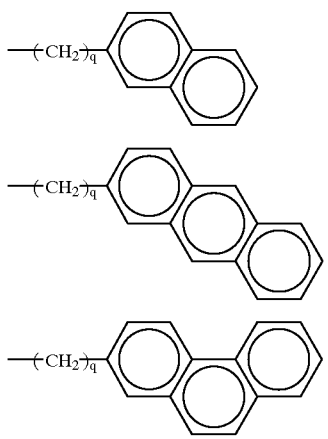

In the above formulas, q is the same as q in the formula (II).

Examples of the cycloolefins represented by the formulas (I) and (II) include bicyclo-2-heptene derivatives (bicyclohept-2-ene derivatives), tricyclo-3-decene derivatives, tricyclo-3-undecene derivatives, tetracyclo-3-dodecene derivatives, pentacyclo-4-pentadecene derivatives, pentacyclopentadecadiene derivatives, pentacyclo-3-pentadecene derivatives, pentacyclo-3-hexadecene derivatives, pentacyclo-4-hexadecene derivatives, hexacyclo-4-heptadecene derivatives, heptacyclo-5-eicosene derivatives, heptacyclo-4-eicosene derivatives, heptacyclo-5-heneicosene derivatives, octacyclo-5-docosene derivatives, nonacyclo-5-pentacosene derivatives, nonacyclo-6-hexacosene derivatives, cyclopentadiene-acenaphthylene adducts, 1,4-methano-1,4,4a,9a-tetrahydrofluorene derivatives and 1,4-methano-1,4,4a,5,10,10a-hexahydroanthracene derivatives.

Listed below are more specific examples of the cycloolefins represented by the formulas (I) and (II).

Bicyclo[2.2.1]hept-2-ene derivatives such as:

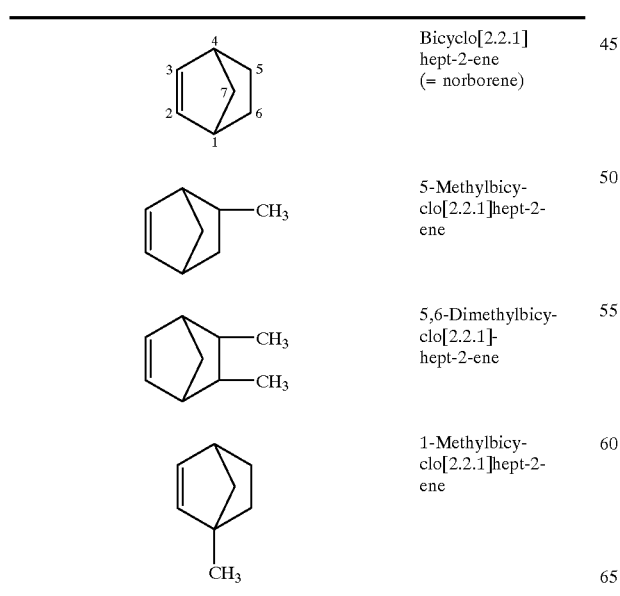

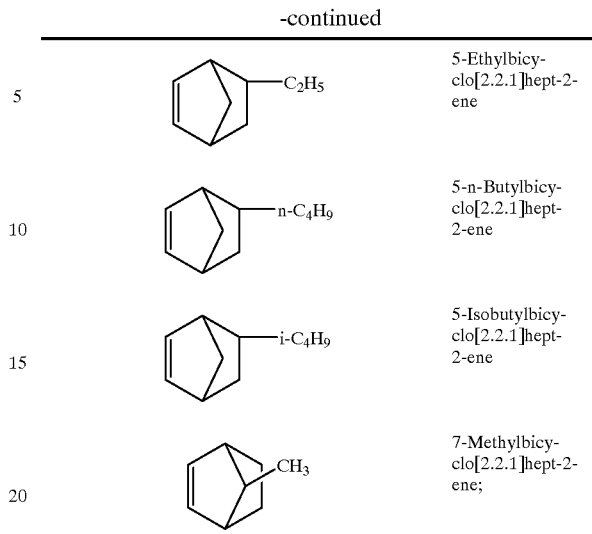

Tricyclo[4.3.0.1$^{2,5}$]-3-decene derivatives such as:

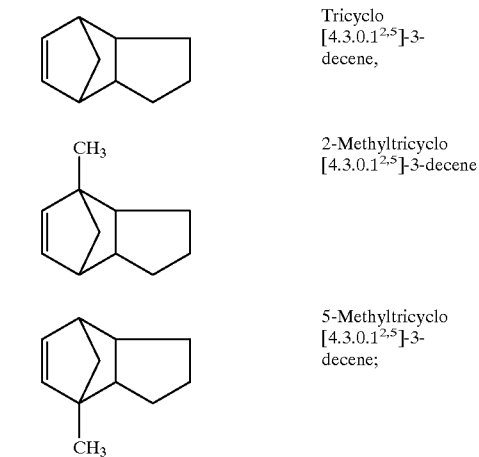

Tricyclo[4.4.0.1$^{2,5}$]-3-undecene derivatives such as:

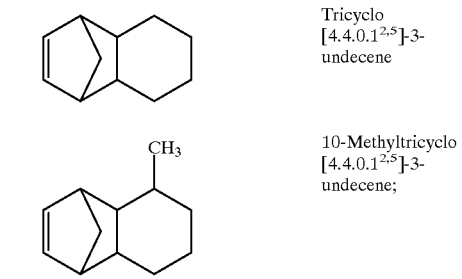

Tetracyclo[4.4.0.1$^{2,5}$.1$^{7,10}$]-3-dodecene derivatives such as:

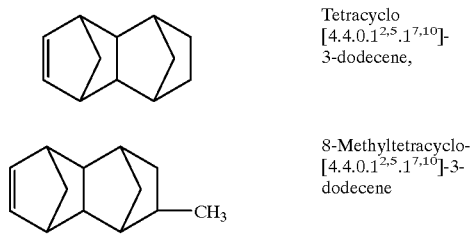

-continued

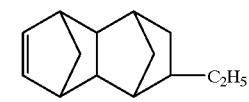 8-Ethyltetracyclo [4.4.0.1$^{2,5}$.1$^{7,10}$]-3-dodecene

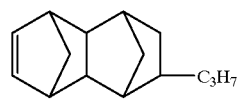 8-Propyltetracyclo [4.4.0.1$^{2,5}$.1$^{7,10}$]-3-dodecene

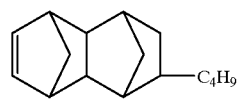 8-Butyltetracyclo [4.4.0.1$^{2,5}$.1$^{7,10}$]-3-dodecene

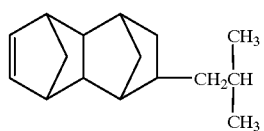 8-Isobutyltetracyclo [4.4.0.1$^{2,5}$.1$^{7,10}$]-3-dodecene

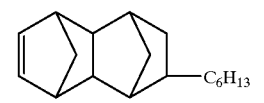 8-Hexyltetracyclo [4.4.0.1$^{2,5}$.1$^{7,10}$]-3-dodecene

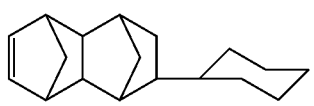 8-Cyclo-hexyltetracy-clo[4.4.0.1$^{2,5}$.1$^{7,10}$]-3-dodecene

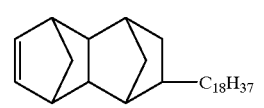 8-Stearyltetracyclo [4.4.0.1$^{2,5}$.1$^{7,10}$]-3-dodecene

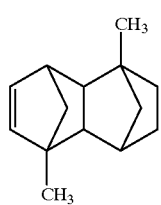 5,10-Dimethyltetra-cyclo [4.4.0.1$^{2,5}$.1$^{7,10}$]-3-dodecene

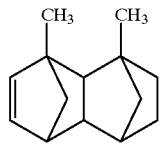 2,10-Dimethyltetra-cyclo [4.4.0.1$^{2,5}$.1$^{7,10}$]-3-dodecene

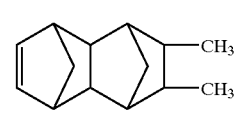 8,9-Dimethyltetra-cyclo [4.4.0.1$^{2,5}$.1$^{7,10}$]-3-dodecene

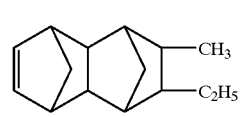 8-Ethyl-9-methyl-tetracyclo [4.4.0.1$^{2,5}$.1$^{7,10}$]-3-dodecene

-continued

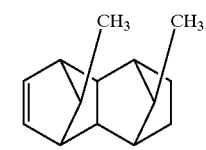 11,12-Dimethyl-tetracyclo [4.4.0.1$^{2,5}$.1$^{7,10}$]-3-dodecene

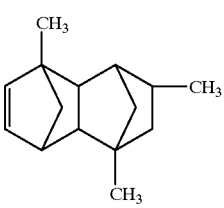 2,7,9-Trimethyl-tetracyclo [4.4.0.1$^{2,5}$.1$^{7,10}$]-3-dodecene

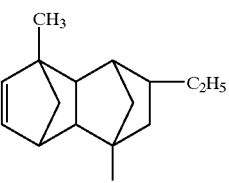 2,7-Dimethyl-9-ethyltetracyclo [4.4.0.1$^{2,5}$.1$^{7,10}$]-3-dodecene

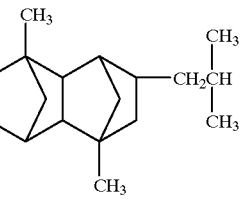 9-Isobutyl-2,7-dimethyltetracyclo [4.4.0.1$^{2,5}$.1$^{7,10}$]-3-dodecene

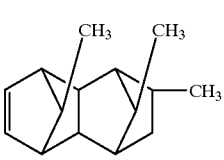 9,11,12-Trimethyl-tetracyclo [4.4.0.1$^{2,5}$.1$^{7,10}$]-3-dodecene

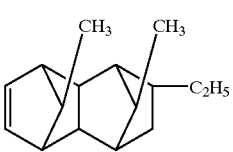 9-Ethyl-11,12-dimethyltetracyclo [4.4.0.1$^{2,5}$.1$^{7,10}$]-3-dodecene

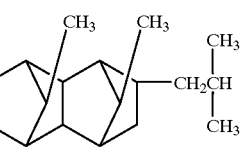 9-Isobutyl-11,12-dimethyltetracyclo [4.4.0.1$^{2,5}$.1$^{7,10}$]-3-dodecene

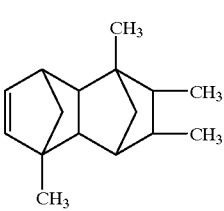 5,8,9,10-Tetramethyl-tetracyclo [4.4.0.1$^{2,5}$.1$^{7,10}$]-3-dodecene -continued

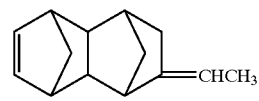 8-Ethylidene-tetracyclo[4.4.0.1$^{2,5}$.1$^{7,10}$]-3-dodecene

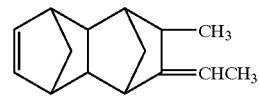 8-Ethylidene-9-methyltetracyclo[4.4.0.1$^{2,5}$.1$^{7,10}$]-3-dodecene

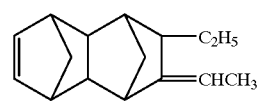 8-Ethylidene-9-ethyltetracyclo[4.4.0.1$^{2,5}$.1$^{7,10}$]-3-dodecene

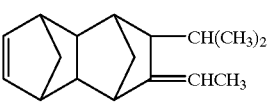 8-Ethylidene-9-isopropyltetracyclo[4.4.0.1$^{2,5}$.1$^{7,10}$]-3-dodecene

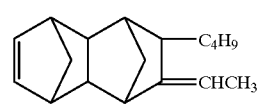 8-Ethylidene-9-butyltetracyclo[4.4.0.1$^{2,5}$.1$^{7,10}$]-3-dodecene

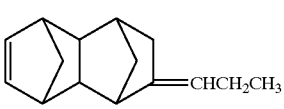 8-n-Propylidene-tetracyclo[4.4.0.1$^{2,5}$.1$^{7,10}$]-3-dodecene

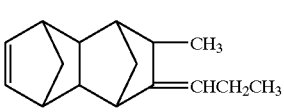 8-n-Propylidene-9-methyltetracyclo[4.4.0.1$^{2,5}$.1$^{7,10}$]-3-dodecene

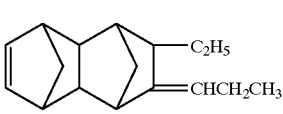 8-n-Propylidene-9-ethyltetracyclo[4.4.0.1$^{2,5}$.1$^{7,10}$]-3-dodecene

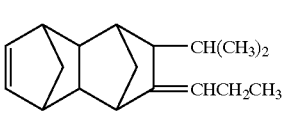 8-n-Propylidene-9-isopropyltetracyclo[4.4.0.1$^{2,5}$.1$^{7,10}$]-3-dodecene

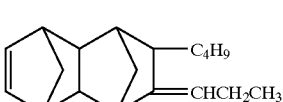 8-n-Propylidene-9-butyltetracyclo[4.4.0.1$^{2,5}$.1$^{7,10}$]-3-dodecene

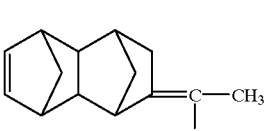 8-Isopropylidene-tetracyclo[4.4.0.1$^{2,5}$.1$^{7,10}$]-3-dodecene

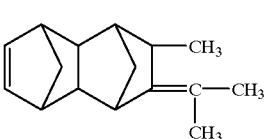 8-Isopropylidene-9-methyltetracyclo[4.4.0.1$^{2,5}$.1$^{7,10}$]-3-dodecene -continued

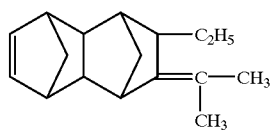 8-Isopropylidene-9-ethyltetracyclo[4.4.0.1$^{2,5}$.1$^{7,10}$]-3-dodecene

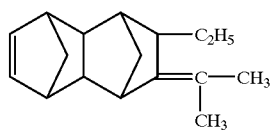 8-Isopropylidene-9-isopropyltetracyclo[4.4.0.1$^{2,5}$.1$^{7,10}$]-3-dodecene

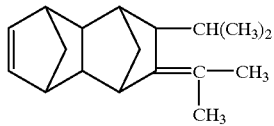 8-Isopropylidene-9-butyltetracyclo[4.4.0.1$^{2,5}$.1$^{7,10}$]-3-dodecene

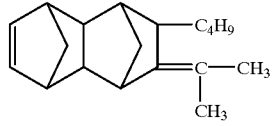 8-Chlorotetracyclo[4.4.0.1$^{2,5}$.1$^{7,10}$]-3-dodecene

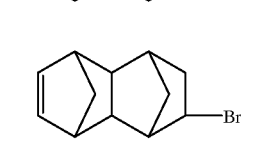 8-Bromotetracyclo[4.4.0.1$^{2,5}$.1$^{7,10}$]-3-dodecene

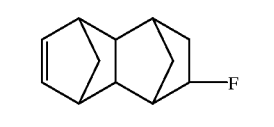 8-Fluorotetracyclo[4.4.0.1$^{2,5}$.1$^{7,10}$]-3-dodecene

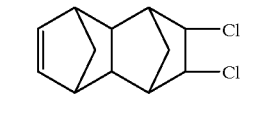 8,9-Dichloro-tetracyclo[4.4.0.1$^{2,5}$.1$^{7,10}$]-3-dodecene

Pentacyclo[6.5.1.1$^{3,6}$.0$^{2,7}$.0$^{9,13}$]-4-pentadecene derivatives such as:

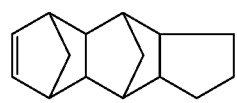 Pentacyclo[6.5.1.1$^{3,6}$.0$^{2,7}$.0$^{9,13}$]-4-pentadecene

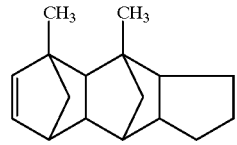 1,3-Dimethylpentacyclo[6.5.1.1$^{3,6}$.0$^{2,7}$.0$^{9,13}$]-4-pentadecene

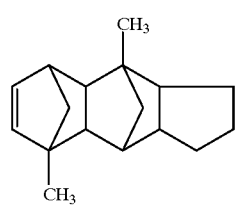 1,6-Dimethyl-pentacyclo[6.5.1.1$^{3,6}$.0$^{2,7}$.0$^{9,13}$]-4-pentadecene

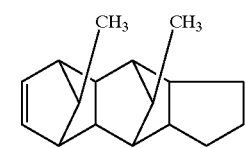 14,15-Dimethyl pentacyclo[6.5.1.1$^{3,6}$.0$^{2,7}$.0$^{9,13}$]-4-pentadecene;

Pentacyclo[7.4.0.1$^{2,5}$.1$^{9,12}$.0$^{8,13}$]-3-pentadecene derivatives such as:

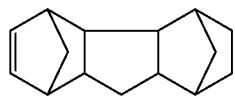 Pentacyclo[7.4.0.1$^{2,5}$.1$^{9,12}$.0$^{8,13}$]-3-pentadecene

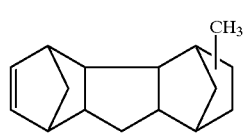 Methyl-substituted pentacyclo[7.4.0.1$^{2,5}$.1$^{9,12}$.0$^{8,13}$]-3-pentadecene;

Pentacyclopentadecadiene derivatives such as:

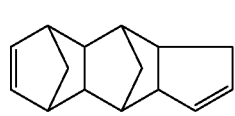 Pentacyclo[6.5.1.1$^{3,6}$.0$^{2,7}$.0$^{9,13}$]-4,10-pentadecadiene;

Pentacyclo[8.4.0.1$^{2,5}$.1$^{9,12}$.0$^{8,13}$]-3-hexadecene derivatives such as:

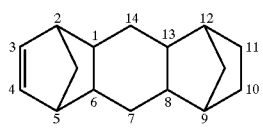 Pentacyclo[8.4.0.1$^{2,5}$.1$^{9,12}$.0$^{8,13}$]-3-hexadecene

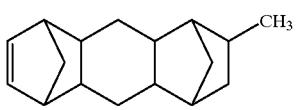 11-Methyl-pentacyclo[8.4.0.1$^{2,5}$.0$^{9,12}$.0$^{8,13}$]-3-hexadecene

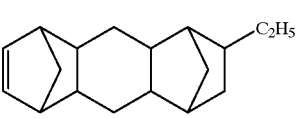 11-Ethylpentacyclo[8.4.0.1$^{2,5}$.0$^{9,12}$.0$^{8,13}$]-3-hexadecene

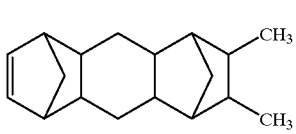 10,11-Dimethyl-pentacyclo[8.4.0.1$^{2,5}$.0$^{9,12}$.0$^{8,13}$]-3-hexadecene Pentacyclo[6.6.1.1$^{3,6}$.0$^{2,7}$.0$^{9,14}$]-4-hexadecene derivatives such as:

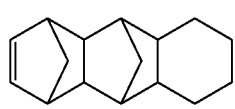 Pentacyclo[6.6.1.1$^{3,6}$.0$^{2,7}$.0$^{9,14}$]-4-hexadecene

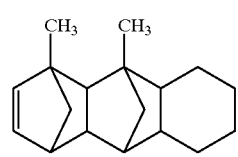 1,3-Dimethyl-pentacyclo[6.6.1.1$^{3,6}$.0$^{2,7}$.0$^{9,14}$]-4-hexadecene

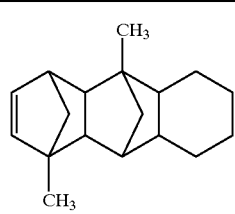 1,6-Dimethyl-pentacyclo[6.6.1.1$^{3,6}$.0$^{2,7}$.0$^{9,14}$]-4-hexadecene

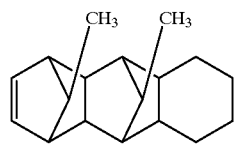 15,16-Dimethyl-pentacyclo[6.6.1.1$^{3,6}$.0$^{2,7}$.0$^{9,14}$]-4-hexadecene;

Hexacyclo[6.6.1.1$^{3,6}$.1$^{10,13}$.0$^{2,7}$.0$^{9,14}$]-4-heptadecene derivatives such as:

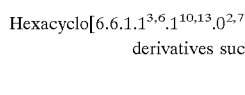 Hexacyclo[6.6.1.1$^{3,6}$.1$^{10,13}$.0$^{2,7}$.0$^{9,14}$]-4-heptadecene;

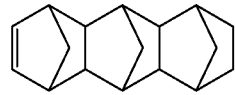 12-Methylhexacyclo[6.6.1.1$^{3,6}$.1$^{10,13}$.0$^{2,7}$.0$^{9,14}$]-4-heptadecene;

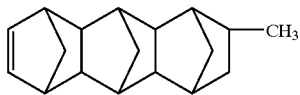 12-Ethylhexacyclo[6.6.1.1$^{3,6}$.1$^{10,13}$.0$^{2,7}$.0$^{9,14}$]-4-heptadecene

 12-Isobutyl-hexacyclo[6.6.1.1$^{3,6}$.1$^{10,13}$.0$^{2,7}$.0$^{9,14}$]-4-heptadecene;

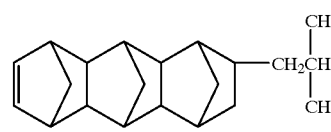 1,6,10-Trimethyl-12-isobutylhexacyclo[6.6.1.1$^{3,6}$.1$^{10,13}$.0$^{2,7}$.0$^{9,14}$]-4-heptadecene;

Heptacyclo-5-eicosene derivatives such as:

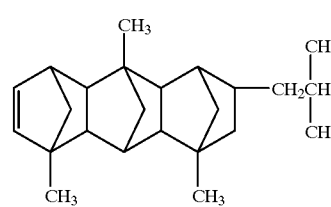 Heptacyclo[8.7.0.1$^{2,9}$.1$^{4,7}$.1$^{11,17}$.0$^{3,8}$.0$^{12,16}$]-5-eicosene;

Heptacyclo[8.7.0.1$^{3,6}$.1$^{10,17}$.1$^{12,15}$.0$^{2,7}$.0$^{11,16}$]-4-eicosene derivatives such as:

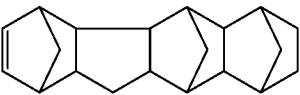 Heptacyclo[8.7.0.1$^{3,6}$.1$^{10,17}$.1$^{12,15}$.0$^{2,7}$.0$^{11,16}$]-4-eicosene

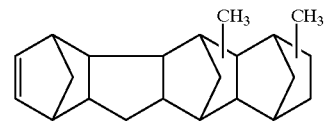 Dimethyl-substituted heptacyclo[8.7.0.1$^{3,6}$.1$^{10,17}$.1$^{12,15}$.0$^{2,7}$.0$^{11,16}$]-4-eicosene;

Heptacyclo-5-heneicosene derivatives such as:

 Heptacyclo[8.8.0.1$^{2,9}$.1$^{4,7}$.1$^{11,18}$.0$^{3,8}$.0$^{12,17}$]-5-heneicosene

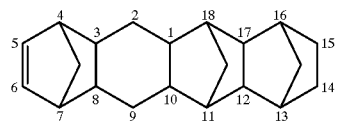 Heptacyclo[8.8.0.1$^{4,7}$.1$^{11,18}$.1$^{13,16}$.0$^{3,8}$.0$^{12,17}$]-5-heneicosene

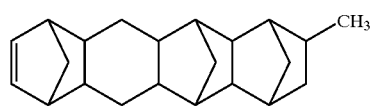 15-Methyl-heptacyclo[8.8.0.1$^{4,7}$.1$^{11,18}$.1$^{13,16}$.0$^{3,8}$.0$^{12,17}$]-5-heneicosene

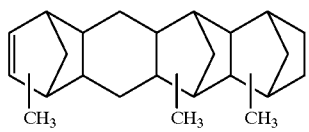 Trimethyl-substituted heptacyclo[8.8.0.1$^{4,7}$.1$^{11,18}$.1$^{13,16}$.0$^{3,8}$.0$^{12,17}$]-5-heneicosene;

Octacyclo[8.8.0.1$^{2,9}$.1$^{4,7}$.1$^{11,18}$.1$^{13,16}$.0$^{3,8}$.0$^{12,17}$]-5-docosene derivatives such as:

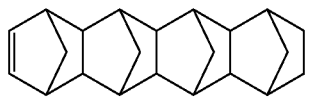 Octacyclo[8.8.0.1$^{2,9}$.1$^{4,7}$.1$^{11,18}$.1$^{13,16}$.0$^{3,8}$.0$^{12,17}$]-5-docosene

 15-Methyloctacyclo[8.8.0.1$^{2,9}$.1$^{4,7}$.1$^{11,18}$.1$^{13,16}$.0$^{3,8}$.0$^{12,17}$]-5-docosene;

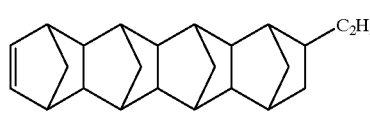 15-Ethyloctacyclo[8.8.0.1$^{2,9}$.1$^{4,7}$.1$^{11,18}$.1$^{13,16}$.0$^{3,8}$.0$^{12,17}$]-5-docosene;

Nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene derivatives such as:

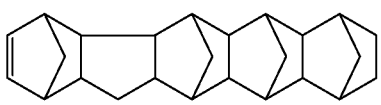 Nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene

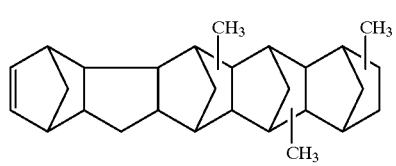 Trimethyl-substituted nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene Nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivatives such as:

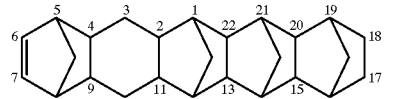 Nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene Further, the following examples can be mentioned.

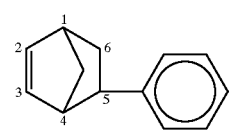 5-Phenyl-bicyclo[2.2.1]hept-2-ene

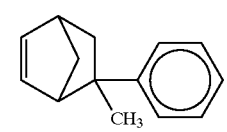 5-Methyl-5-phenyl-bicyclo[2.2.1]hept-2-ene

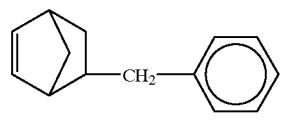 5-Benzyl-bicyclo[2.2.1]hept-2-ene

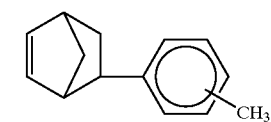 5-Tolyl-bicyclo[2.2.1]hept-2-ene

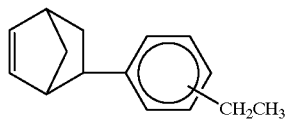 5-(Ethylphenyl)-bicyclo[2.2.1]hept-2-ene

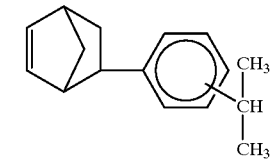 5-(Isopropylphenyl)-bicyclo[2.2.1]-hept-2-ene

 5-(Biphenyl)-bicyclo[2.2.1]hept-2-ene

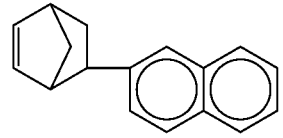 5-(β-Naphthyl)-bicyclo[2.2.1]hept-2-ene

| Structure | Name |
|---|---|
| 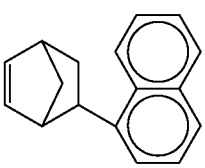 | 5-(α-Naphthyl)-bicyclo[2.2.1]hept-2-ene |
| 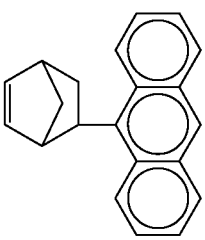 | 5-(Anthracenyl)-bicyclo[2.2.1]hept-2-ene |
| 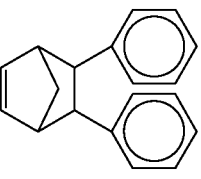 | 5,6-Diphenyl-bicyclo[2.2.1]hept-2-ene |
| 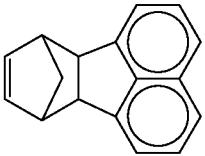 | Cyclopentadiene-acenaphthylene adducts |
| 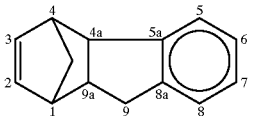 | 1,4-Methano-1,4,4a,9a-tetrahydrofluorene |
| 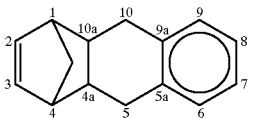 | 1,4-Methano-1,4,4a,5,10,10a-hexahydro-anthracene |
| 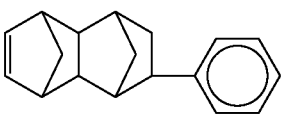 | 8-Phenyltetracyclo[$4.4.0.0^{2,5}.1^{7,10}$]-3-dodecene |
| 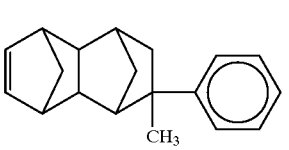 | 8-Methyl-8-phenyl-tetracyclo[$4.4.0.0^{2,5}.1^{7,10}$]-3-dodecene |
| 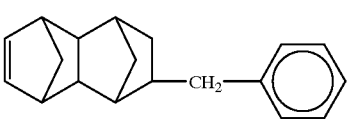 | 8-Benzyl-tetracyclo[$4.4.0.0^{2,5}.1^{7,10}$]-3-dodecene |
| 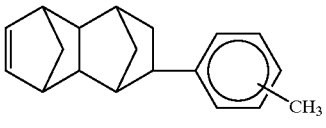 | 8-Tolyl-tetracyclo[$4.4.0.0^{2,5}.1^{7,10}$]-3-dodecene |
| 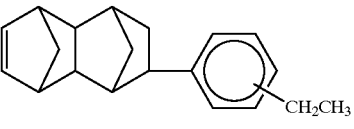 | 8-(Ethylphenyl)-tetracyclo[$4.4.0.0^{2,5}.1^{7,10}$]-3-dodecene |
| 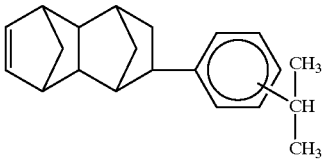 | 8-(Isopropylphenyl)-tetracyclo[$4.4.0.0^{2,5}.1^{7,10}$]-3-dodecene |
| 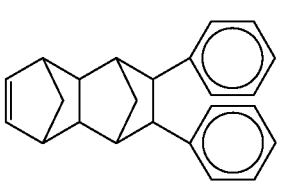 | 8,9-Diphenyl-tetracyclo[$4.4.0.0^{2,5}.1^{7,10}$]-3-dodecene |
| 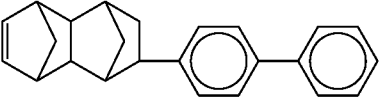 | 8-(Biphenyl)-tetracyclo[$4.4.0.0^{2,5}.1^{7,10}$]-3-dodecene |
| 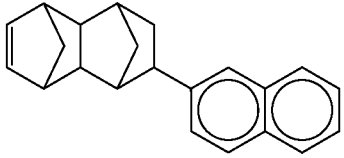 | 8-(β-Naphthyl)-tetracyclo[$4.4.0.0^{2,5}.1^{7,10}$]-3-dodecene |
| 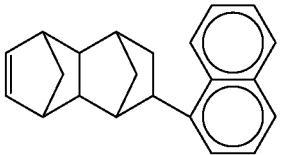 | 8-(α-Naphthyl)-tetracyclo[$4.4.0.0^{2,5}.1^{7,10}$]-3-dodecene |
| 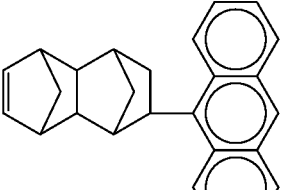 | 8-(Anthracenyl)-tetracyclo[$4.4.0.0^{2,5}.1^{7,10}$]-3-dodecene |
| | Compound of cyclopentadiene-acenaphthylene adducts with cyclopentadiene further added |

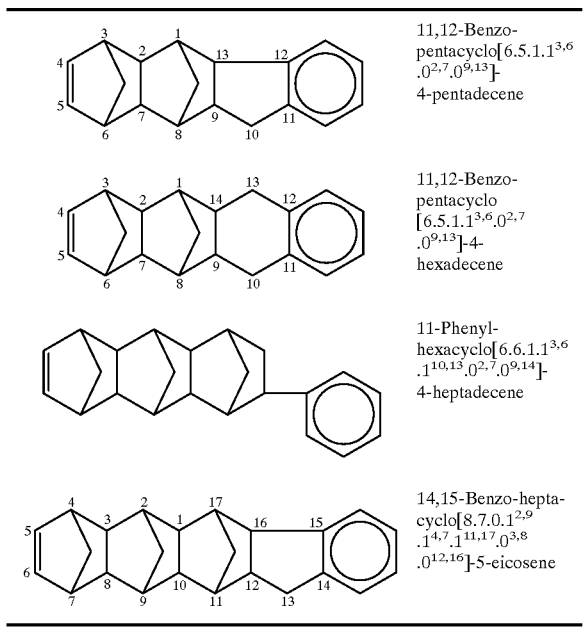

11,12-Benzo-pentacyclo[6.5.1.1^{3,6}.0^{2,7}.0^{9,13}]-4-pentadecene 11,12-Benzo-pentacyclo[6.5.1.1^{3,6}.0^{2,7}.0^{9,13}]-4-hexadecene 11-Phenyl-hexacyclo[6.6.1.1^{3,6}.1^{10,13}.0^{2,7}.0^{9,14}]-4-heptadecene 14,15-Benzo-heptacyclo[8.7.0.1^{2,9}.1^{4,7}.1^{11,17}.0^{3,8}.0^{12,16}]-5-eicosene Of the above compounds, preferable are bicyclo[2.2.1]-2-heptene derivatives, tetracyclo[4.4.0.1^{2,5}.1^{7,10}]-3-dodecene derivatives and hexacyclo[6.6.1.1^{3,6}.1^{10,13}.0^{2,7}.0^{9,14}]-4-heptadecene derivatives. Particularly preferable are bicyclo[2.2.1]-2-heptene and tetracyclo[4.4.0.1^{2,5}.1^{7,10}]-3-dodecene.

The cycloolefins represented by the formula (I) or (II) can be used singly or in combination of two or more kinds. The cycloolefins represented by the formula (I) or (II) can be prepared by subjecting cyclopentadiene and an olefin having the corresponding structure to Diels-Alder reaction.

(C) Aromatic vinyl compound

Examples of the aromatic vinyl compounds (C) include styrene; mono or polyalkyl styrenes, such as o-methylstyrene, m-methylstyrene, p-methylstyrene, o,p-dimethylstyrene, o-ethylstyrene, m-ethylstyrene and p-ethylstyrene; functional group-containing styrene derivatives, such as methoxystyrene, ethoxystyrene, vinylbenzoic acid, methyl vinylbenzoate, vinylbenzyl acetate, hydroxystyrene, o-chlorostyrene, p-chlorostyrene and divinylbenzene; 3-phenylpropylene; 4-phenylbutene; and α-methylstyrene. These aromatic vinyl compounds can be used singly or in combination of two or more kinds.

In the cycloolefin copolymer of the invention, the constituent units derived from the straight-chain or branched α-olefin of 2 to 20 carbon atoms (A), the constituent units derived from the cycloolefin (B) represented by the formula (I) or (II) and the constituent units derived from the aromatic vinyl compound (C) are bonded at random to form a copolymer.

It is desired that the cycloolefin copolymer of the invention has an intrinsic viscosity [η] of usually 0.1 to 10 dl/g, preferably 0.2 to 10 dl/g, more preferably 0.3 to 8 dl/g.

In the cycloolefin copolymer of the invention, it is desired that the content of the constituent units derived from the straight-chain or branched α-olefin (A) is in the range of 30 to 89% by mol, preferably 40 to 80% by mol, the content of the constituent units derived from the cycloolefin (B) is in the range of 10 to 70% by mol, preferably 20 to 60% by mol, and the content of the constituent units derived from aromatic vinyl compound (C) is in the range of 0.1 to 35% by mol, preferably 0.2 to 20% by mol.

It is also desired that the content (B (% by mol)) of the constituent units derived from the cycloolefin (B) and the content (C (% by mol)) of the constituent units derived from the aromatic vinyl compound (C) satisfy the following relation:

$$0.5 \times B \geq C \geq 0.01 \times B,$$

preferably $$0.4 \times B \geq C \geq 0.01 \times B,$$

more preferably $$0.3 \times B \geq C \geq 0.01 \times B.$$

The cycloolefin copolymer of the invention is desired to have a glass transition temperature (Tg) of usually 60 to 170° C., 70 to 160° C., more preferably 80 to 160° C.

The cycloolefin copolymer of the invention can be prepared by copolymerizing the straight-chain or branched α-olefin (A), the cycloolefin (B) and the aromatic vinyl compound (C) in the presence of, for example, a metallocene catalyst.

As the metallocene catalyst, any of conventional metallocene type catalysts having been used as single site catalysts and metallocene type catalysts analogous thereto can be used without specific limitation. Particularly preferably used is a catalyst comprising (a) a metallocene compound of a transition metal (transition metal compound) and (b) an organoaluminum oxy-compound and/or (c) an ionizing ionic compound.

The metallocene compound (a) is, for example, a transition metal compound represented by the following formula (III).

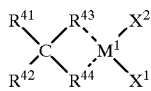

(III)

In the above formula, $M^1$ is titanium, zirconium or hafnium, preferably zirconium.

$X^1$ and $X^2$ may be the same as or different from each other, and are each a hydrogen atom, a halogen atom, an alkyl group of 1 to 10 carbon atoms, an alkoxy group of 1 to 10 carbon atoms, an aryl group of 6 to 10 carbon atoms, an aryloxy group of 6 to 10 carbon atoms, an alkenyl group of 2 to 10 carbon atoms, an arylalkyl group of 7 to 40 carbon atoms, an alkylaryl group of 7 to 40 carbon atoms or an arylalkenyl group of 8 to 40 carbon atoms.

Examples of the halogen atoms include fluorine, chlorine, bromine and iodine.

Preferred examples of the alkyl groups of 1 to 10 carbon atoms include methyl, ethyl, propyl, butyl, hexyl, octyl and decyl.

Examples of the alkoxy groups of 1 to 10 carbon atoms include methoxy, ethoxy, propoxy, butoxy, hexoxy, octoxy and decyloxy.

Examples of the aryl groups of 6 to 10 carbon atoms include phenyl and naphthyl.

Examples of the aryloxy groups of 6 to 10 carbon atoms include phenyloxy and naphthyloxy.

Examples of the alkenyl groups of 2 to 10 carbon atoms include ethenyl, propenyl, 4-methyl-1-pentenyl and decenyl.

Examples of the arylalkyl groups of 7 to 40 carbon atoms include benzyl, phenethyl and 1-phenylpropyl.

Examples of the alkylaryl groups of 7 to 40 carbon atoms include tolyl, ethyl, phenyl, propylphenyl, n-butylphenyl and t-butylphenyl.

Examples of the arylalkenyl groups of 8 to 40 carbon atoms include phenylethylenyl.

$R^{41}$ and $R^{42}$ may be the same as or different from each other; and they are each a hydrogen atom, a halogen atom, an alkyl group of 1 to 10 carbon atoms, a fluoroalkyl group of 1 to 10 carbon atoms, a fluoroaryl group of 6 to 10 carbon atoms, an aryl group of 6 to 10 carbon atoms, an alkoxy group of 1 to 10 carbon atoms, an alkenyl group of 2 to 10 carbon atoms, an arylalkyl group of 7 to 40 carbon atoms, an alkylaryl group of 7 to 40 carbon atoms or an arylalkenyl group of 8 to 40 carbon atoms; or $R^{41}$ and $R^{42}$ may form a ring together with an atom to which they are bonded.

Examples of the halogen atoms, the alkyl groups of 1 to 10 carbon atoms, the aryl groups of 6 to 10 carbon atoms, the alkoxy groups of 1 to 10 carbon atoms, the alkenyl groups of 2 to 10 carbon atoms, the arylalkyl groups of 7 to 40 carbon atoms, the alkylaryl groups of 7 to 40 carbon atoms and the arylalkenyl groups of 8 to 40 carbon atoms are the same atoms and groups exemplified for the above $X^1$ and $X^2$.

Examples of the fluoroalkyl groups of 1 to 10 carbon atoms include trifluoromethyl, pentafluoroethyl and heptafluoropropyl.

Examples of the fluoroaryl groups of 6 to 10 carbon atoms include pentafluorophenyl.

Of these, an alkyl group of 1 to 10 carbon atoms is preferable and an alkyl group of 1 to 3 carbon atoms is particularly preferable as each of $R^{41}$ and $R^{42}$.

$R^{43}$ and $R^{44}$ may be the same as or different from each other, and are each a hydrocarbon group which is capable of forming a sandwich structure together with the central metal $M^1$ and has cyclopentadienyl skeleton and a structure of two or more rings.

Specifically, an indenyl group, its derivatives, a fluorenyl group and its derivatives can be mentioned as the preferred examples. A particularly preferable combination of $R^{43}$ and $R^{44}$ is a combination of indenyl groups or a combination of derivatives of an indenyl group.

Examples of the transition metal compounds represented by the formula (III) wherein the transition metal ($M^1$) is zirconium include:

diphenylmethylene-bis(1-indenyl)zirconium dichloride,
isopropylidene-bis(1-indenyl)zirconium dichloride,
cyclohexylidene-bis(1-indenyl)zirconium dichloride,
diphenylmethylene-bis(9-fluorenyl)zirconium dichloride,
isopropylidene-bis(9-fluorenyl)zirconium dichloride, and
cyclohexylidene-bis(9-fluorenyl)zirconium dichloride.

Of these, preferable are diphenylmethylene-bis(1-indenyl)zirconium dichloride and isopropylidene-bis(1-indenyl)zirconium dichloride.

Also employable as the metallocene compound (a) in the invention is a metallocene compound represented by the following formula (IV):

$$L^1 M^2 Z^1_2 \quad (IV)$$

wherein $M^2$ is a metal of Group 4 or lanthanum series of the periodic table, $L^1$ is a derivative of a delocalized π-bond group and imparts a restraint geometric shape to the active site of the metal $M^2$, and each $Z^1$ is the same or different and is a hydrogen atom, a halogen atom, or a hydrocarbon, silyl or germyl group containing up to 20 carbon atoms, silicon atoms or germanium atom.

Of the metallocene compounds (a) represented by the formula (IV), a metallocene compound represented by the following (V) is preferable.

(V)

In the formula (V), $M^3$ is titanium, zirconium or hafnium, and $Z^1$ is the same as described above.

Cp is a cyclopentadienyl group, a substituted cyclopentadienyl group or a derivative thereof, each of which is π-bonded to $M^3$ in the $\eta^5$ bond way.

$W^1$ is oxygen, sulfur, boron, an element of Group 14 of the periodic table or a group containing any of these elements.

$V^1$ is a ligand containing nitrogen, phosphorus, oxygen or sulfur.

$W^1$ and $V^1$ may together form a condensed ring, and Cp and $W^1$ may together form a condensed ring.

Preferred examples of the groups indicated by Cp in the formula (V) include a cyclopentadienyl group, an indenyl group, a fluorenyl group and saturated derivatives of these groups, and they form a ring together with the metal atom ($M^3$). The carbon atoms in the cyclopentadienyl group can be the same or different groups selected from the class consisting of a hydrocarbyl group and a substituted hydrocarbyl group, and one or more carbon atoms therein are substituted with halogen atoms or hydrocarbyl-substituted metalloid groups. The metalloid is selected from Group 14 of the periodic table and halogen atoms. One or more substituents may form a condensed ring. The hydrocarbyl or substituted hydrocarbyl group capable of substituting at least one hydrogen atom in the cyclopentadienyl group preferably contains 1 to 20 carbon atoms, and examples thereof include a straight-chain or branched alkyl group, a cyclic hydrocarbon group, an alkyl-substituted cyclic hydrocarbon group, an aromatic group and an alkyl-substituted aromatic group. The preferred organometalloid groups include mono-, di- and tri-substituted substituted organometalloid groups of Group 14 elements. Each of the hydrocarbyl groups contains 1 to 20 carbon atoms. Examples of the preferred organometalloid groups include trimethylsilyl, triethylsilyl, ethyldimethylsilyl, methyldiethylsilyl, phenyldimethylsilyl, methyldiphenylsilyl, triphenylsilyl, triphenylgermyl and trimethylgermyl.

Examples of the groups indicated by $Z^1$ in the formula (V) include hydride, halo, alkyl, silyl, germyl, aryl, amide, aryloxy, alkoxy, phosphide, sulfide, acyl, pseudo halide (e.g., cyanide, azide), acetylacetonate and mixtures thereof. Each $Z^1$ may be the same or different.

Of the metallocene compounds (a) represented by the formula (V), a metallocene compound represented by the following formula (V-1) is preferable.

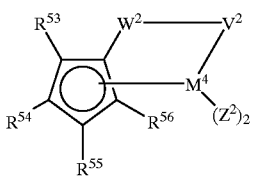

(V-1)

In the formula (V-1), $M^4$ is the same as the above $M^3$; $V^2$ is —O—, —S—, —$NR^{47}$—, —$PR^{47}$— or a neutral two-electron donor ligand selected from the group consisting of $OR^{47}$, $SR^{47}$, $N(R^{47})_2$ and $P(R^{47})_2$. $R^{47}$ is a hydrogen atom or an alkyl, aryl, silyl, halogenated alkyl or halogenated aryl group having up to 20 atoms other than hydrogen; or two of $R^{47}$, or $R^{47}$ and $R^{48}$ described later may form a condensed ring.

In the formula (V-1), $W^2$ is $Si(R^{48})_2$, $C(R^{48})_2$, $Si(R^{48})_2Si(R^{48})_2$, $C(R^{48})_2C(R^{48})_2$, $CR^{48}=CR^{48}$, $C(R^{48})_2Si(R^{48})_2$, $Ge(R^{48})_2$, $BR^{48}$ or $B(R^{48})_2$. $R^{48}$ is the same as the above $R^{47}$.

In the formula (V-1), $R^{53}$ to $R^{56}$ are each independently a hydrogen atom, or alkyl, aryl, silyl, germyl, cyano, halo or a mixture thereof (e.g., alkylaryl, aralkyl, silyl-substituted alkyl, silyl-substituted aryl, cyanoalkyl, cyanoaryl, haloalkyl, halosilyl) each of which has up to 20 atoms other than hydrogen; or an adjacent pair of $R^{53}$ to $R^{56}$ may form a hydrocarbyl ring condensed with the cyclopentadienyl moiety.

In each case, $Z^2$ in the formula (V-1) is hydride or a group selected from the class consisting of halo, alkyl, arylsilyl, germyl, aryloxy, alkoxy, amide, silyloxy, a mixture thereof (e.g., alkylaryl, aralkyl, silyl-substituted alkyl, silyl-substituted aryl, aryloxyalkyl, aryloxyaryl, alkoxyalkyl, alkoxyaryl, amidoalkyl, amidoaryl, siloxyalkyl, siloxyaryl, armidosyloxyalkyl; haloalkyl, haloaryl) each of which has up to 20 atoms other than hydrogen, and neutral Lewis base having up to 20 atoms other than hydrogen.

In the metallocene compound (a) represented by the formula (V-1), when $V^2$ is a neutral two-electron donor ligand, the bond between $M^4$ and $V^2$ is a bond which is more correctly called "coordination covalent bond". The complex is able to exist as a dimer or a higher oligomer.

In the metallocene compound (a) represented by the formula (V-1), it is preferable that at least one of $R^{53}$ to $R^{56}$, $Z^2$, $R^{47}$ and $R^{48}$ is preferably an electron donative moiety, and it is particularly preferable that $V^2$ is an amide or phosphide group corresponding to —$NR^{19}$— or —$PR^{19}$— ($R^{19}$ is alkyl of 1 to 10 carbon atoms or aryl of 6 to 10 carbon atoms).

Of the metallocene compounds (a) represented by the formula (V-1), an amidosilane or amidoalkanediyl compound represented by the following formula (V-2) is preferable.

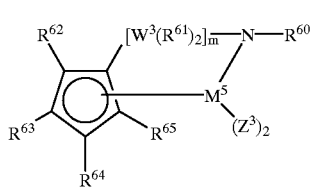

(V-2)

In the formula (V-2), $M^5$ is titanium, zirconium or hafnium each of which is bonded to the cyclopentadienyl group in the $\eta^5$ bond way; and $R^{60}$ and $R^{65}$ are each independently a hydrogen atom or a group selected from the class consisting of silyl, alkyl, aryl and a mixture thereof each of which has up to 10 carbon atoms; or an adjacent pair of $R^{62}$ to $R^{65}$ may form a hydrocarbyl ring condensed with the cyclopentadienyl moiety.

In the formula (V-2), $W^3$ is silicon or carbon, and in each case, $Z^3$ is hydride, halo, or alkyl, aryl, aryloxy or alkoxy each of which has up to 10 carbon atoms.

Of the metallocene compounds (a) represented by the formula (V-2), preferable is a metallocene compound wherein $R^{60}$ is methyl, ethyl, propyl, butyl, pentyl, hexyl (including isomers), norbornyl, benzyl, phenyl or the like, $R^{62}$ to $R^{65}$ are each independently a hydrogen atom, methyl, ethyl, propyl, butyl, pentyl, hexyl (including isomers), norbornyl, benzyl or the like, and $Z^3$ is chloro, bromo, iodo, methyl, ethyl, propyl, butyl, pentyl, hexyl (including isomers), norbornyl, benzyl, phenyl or the like. Also preferable is a metallocene compound wherein $R^{62}$ to $R^{65}$ form a condensed ring, and the cyclopentadienyl moiety is an indenyl, tetrahydroindenyl, fluorenyl or octahydrofluorenyl ring.

Examples of the metallocene compounds represented by the formula (V-2) include (t-butylamido)dimethyl (tetramethyl-$\eta^5$-cyclopentadienyl)silanetitanium dichloride, (t-butylamido) (tetramethyl-$\eta^5$-cyclopentadienyl)-1,2-ethanediylzirconium dichloride, (t-butylamido) (tetramethyl-$\eta^5$-cyclopentadienyl)-1,2-ethanediyltitanium dichloride, (methylamido) (tetramethyl-$\eta^5$-cyclopentadienyl)-1,2-ethanediylzirconium dichloride, (methylamido) (tetramethyl-$\eta^5$-cyclopentadienyl)-1,2-ethanediyltitanium dichloride, (ethylamido)(tetramethyl-$\eta^5$-cyclopentadienyl)-methylenetitanium dichloride, (t-butylamido)dimethyl(tetramethyl-$\eta^5$-cyclopentadienyl) silanezirconiumdibenzyl, (benzylamido)dimethyl (tetramethyl-$\eta^5$-cyclopentadienyl)silanetitanium dichloride and (phenylphosphide)dimethyl(tetramethyl-$\eta^5$-cyclopentadienyl)silanezirconiumdibenzyl.

As the metallocene compound (a), the metallocene compound represented by the formula (III) is particularly preferable from the viewpoints of polymerization activity and transparency, rigidity, heat resistance and impact resistance of the molded products. The metallocene compounds (a) mentioned above can be used singly or in combination of two or more kinds. The metallocene compound (a) for use in the invention may be diluted with hydrocarbon or halogenated hydrocarbon prior to use.

Next, the organoaluminum oxy-compound (b) and the ionizing ionic compound (c) used for preparing the metallocene catalyst are described.

The organoaluminum oxy-compound (b) may be conventional aluminoxane (b) or such a benzene-insoluble organoaluminum oxy-compound (b) as exemplified in Japanese Patent Laid-Open Publication No. 78687/1990.

The aluminoxane (b) is prepared by, for example, the following processes and is generally recovered as a hydrocarbon solvent solution.

(1) An organoaluminum compound such as trialkylaluminum is added to an aromatic hydrocarbon solvent in which a compound containing adsorbed water or a salt containing water of crystallization, e.g., magnesium chloride hydrate, copper sulfate hydrate, aluminum sulfate hydrate, nickel sulfate hydrate or cerous chloride hydrate, is suspended to thereby allow the organoaluminum compound to react with the adsorbed water or the water of crystallization, followed by recovering aluminoxane as its aromatic hydrocarbon solvent solution.

(2) Water, ice or water vapor is allowed to directly act on an organoaluminum compound such as trialkylaluminum in a medium such as benzene, toluene, ethyl ether or tetrahydrofuran, followed by recovering aluminoxane as its aromatic hydrocarbon solvent solution.

(3) An organotin oxide such as dimethyltin oxide or dibutyltin oxide is allowed to react with an organoaluminum compound such as trialkylaluminum in a hydrocarbon medium such as decane, benzene or toluene.

Examples of the ionizing ionic compounds (c) includes Lewis acid, ionic compounds, borane compounds and carborane compounds. These ionizing ionic compounds (c) are described in National Publications of International Patent No. 501950/1989 and No. 502036/1989, Japanese Patent Laid-Open Publications No. 179005/1991, No. 179006/1991, No. 207703/1991 and No. 207704/1991, and U.S. Pat. No. 5,321,106.

The Lewis acid which may be used as the ionizing ionic compound (c) is, for example, a compound represented by the formula $BR_3$ (each R is the same or different and is a phenyl group which may have a substituent such as fluorine, methyl or trifluoromethyl, or a fluorine atom). Examples of such compounds include trifluoroboron, triphenylboron, tris (4-fluorophenyl)boron, tris(3,5-difluorophenyl)boron, tris (4-fluoromethylphenyl)boron and tris(pentafluorophenyl) boron.

The ionic compound which may be used as the ionizing ionic compound (c) is a salt comprising a cationic compound and an anionic compound. The anion reacts with the metallocene compound (a) to render the compound (a) cationic and to form an ion pair, whereby the transition metal cation seed is stabilized. Examples of such anions include organoboron compound anion, organoarsenic compound anion and organoaluminum compound anion. Preferable are anions which are relatively bulky and stabilize the transition metal cation seed. Examples of the cations include metallic cation, organometallic cation, carbonium cation, tripium cation, oxonium cation, sulfonium cation, phosphonium cation and ammonium cation. More specifically, there can be mentioned triphenylcarbenium cation, tributylammonium cation, N,N-dimethylammonium cation, ferrocenium cation and the like.

Of the above compounds, preferable are the ionic compounds containing a boron compound as the anion, and examples of such compounds include trialkyl-substituted ammonium salts, N,N,-dialkylanilinium salts, dialkylammonium salts and triarylphosphonium salts.

Examples of the trialkyl-substituted ammonium salts include triethylammoniumtetra(phenyl)boron, tripropylammoniumtetra(phenyl)boron, tri(n-butyl) ammoniumtetra(phenyl)boron and trimethylammoniumtetra(p-tolyl)boron.

Examples of the N,N,-dialkylanilinium salts include N,N-dimethylaniliniumtetra(phenyl)boron.

Examples of the dialkylammonium salts include di(n-propyl)ammoniumtetra(pentafluorophenyl)boron and dicyclohexylammoniumtetra(phenyl)boron.

Examples of the triarylphosphonium salts include triphenylphosphoniumtetra(phenyl)boron, tri(methylphenyl)phosphoniumtetra(phenyl)boron and tri(dimethylphenyl)phosphoniumtetra(phenyl)boron.

Also available as the ionic compounds are triphenylcarbeniumtetrakis(pentafluorophenyl)borate, N,N-dimethylaniliniumtetrakis(pentafluorophenyl)borate and ferroceniumtetrakis(pentafluorophenyl)borate.

Examples of the borane compounds which may be used as the ionizing ionic compounds (c) include:

decaborane(14);

salts of anions, such as bis[tri(n-butyl)ammonium] nonaborate and bis[tri(n-butyl)ammonium]decaborate; and salts of metallic borane anions, such as tri(n-butyl) ammoniumbis(dodecahydridododecaborate)cobaltate (III) and bis[tri(n-butyl)ammonium]bis (dodecahydridododecaborate)-nickelate(III).

Examples of the carborane compounds which may be used as the ionizing ionic compounds (c) include:

salts of anions, such as 4-carbanonaborane(14) and 1,3-dicarbanonaborane(13); and salts of metallic carborane anions, such as tri(n-butyl) ammoniumbis(nonahydrido-1,3-dicarbanonaborate) cobaltate(III) and tri(n-butyl)ammoniumbis (undecahydrido-7,8-dicarbaundecaborate)ferrate(III).

The ionizing ionic compounds (c) mentioned above can be used singly or in combination of two or more kinds.

The metallocene catalyst for use in the invention may optionally contain the following organoaluminum compound (d) in addition to the above components.

The-organoaluminum compound (d) which is optionally used is an organoaluminum compound represented by, for example, the following formula (VI):

$(R^6)_n AlX_{3-n}$ (VI)

wherein $R^6$ is a hydrocarbon group of 1 to 15 carbon atoms, preferably a hydrocarbon group of 1 to 4 carbon atoms, X is a halogen atom or a hydrogen atom, and n is 1 to 3.

The hydrocarbon group of 1 to 15 carbon atoms is, for example, an alkyl group, a cycloalkyl group or an aryl group. Examples of such groups include methyl, ethyl, n-propyl, isopropyl and isobutyl.

Examples of the organoaluminum compounds include:

trialkylaluminums, such as trimethylaluminum, triethylaluminum, triisopropylaluminum, tri-n-butylaluminum, triisobutylaluminum and tri-sec-butylaluminum;

alkenylaluminums represented by the formula $(i-C_4H_9)_x Al_y (C_5H_{10})_z$ (wherein x, y and z are each a positive number, and $z \geq 2x$), such as isoprenylaluminum;

dialkylaluminum halides, such as dimethylaluminum chloride and diisobutylaluminum chloride;

dialkylaluminum hydrides, such as diisobutylaluminum hydride;

dialkylaluminum alkoxides, such as dimethylaluminum methoxide; and dialkylaluminum aryloxides, such as diethylaluminum phenoxide.

Copolymerization of the straight-chain or branched α-olefin (A), the cycloolefin (B) and the aromatic vinyl compound (C) can be carried out as any of solution polymerization, bulk polymerization and slurry polymerization, and it can be carried out as any of continuous polymerization and batchwise polymerization.

Examples of polymerization solvents employable in the copolymerization include aliphatic hydrocarbons, such as hexane, heptane, octane and kerosine; alicyclic hydrocarbons, such as cyclohexane and methylcyclohexane; and aromatic hydrocarbons, such as benzene, toluene and xylene. These solvents can be used singly or in combination of two or more kinds.

The copolymerization temperature is in the range of −50 to 230° C., preferably −30 to 200° C., more preferably −20 to 150° C., and the copolymerization reaction time is in the range of 2 minutes to 5 hours, preferably 5 minutes to 3 hours. The pressure in the polymerization reaction is more than 0 kg/cm² and not more than 1,000 kg/cm², preferably more than 0 kg/cm² and not more than 50 kg/cm².

As for the catalyst, the transition metal compound (a), and the organoaluminum oxy-compound (b) and/or the ionizing ionic compound (c), and optionally the organoaluminum compound (d) may be fed separately to the polymerization reactor, or they may be previously brought into contact with each other outside the polymerization reactor.

The concentration of the transition metal compound (a) in the polymerization system is in the range of preferably 0.00005 to 1.0 mmol/liter, more preferably 0.0001 to 0.3 mmol/liter. The organoaluminum oxy-compound (b) and the ionizing ionic compound (c) are each preferably used in an amount of 1 to $10^4$ equivalents based on the transition metal compound. The organoaluminum compound (d) is preferably used in an amount of 0.01 to 100 equivalents based on the aluminum atom in the organoaluminum oxy-compound or the complex metal atom in the ionizing ionic compound (c).

In the synthesis of the copolymer of the invention, a copolymer having desired composition can be synthesized by properly varying the ratio between the straight-chain or branched α-olefin (A), the cycloolefin (B) and the aromatic vinyl compound (C) charged. The ratio (B/C (by mol)) of the cycloolefin (B) to the aromatic vinyl compound (C) is in the range of preferably 9/1 to 1/9, more preferably 7/3 to 8/2.

The cycloolefin copolymer of the invention can be molded into various molded articles by injection molding, compression molding, extrusion molding and the like. From the cycloolefin copolymer, molded articles having high heat resistance, high transparency and small birefringence can be obtained, so that the cycloolefin copolymer is favorable as a material of molded articles for optics, for example, lenses such as spectacle lenses, f·θ lenses and pick-up lenses, prism, optical fibers and substrates of optical recording media or magneto-optical recording media. Further, the cycloolefin copolymer of the invention has low moisture absorption.

EFFECT OF THE INVENTION

From the cycloolefin copolymer according to the invention, molded articles having high heat resistance, high transparency and small birefringence can be obtained.

EXAMPLE

The present invention is further described with reference to the following examples, but it should be construed that the invention is in no way limited to hose examples.

Example 1
Pre-activation of methylaluminoxane

163 Milligrams of isopropylidene-bis(indenyl)zirconium dichloride was weighed out and introduced into a glass container thoroughly purged with nitrogen. To the container, 140 ml of a toluene solution of methylaluminoxane (1.637 mmol/ml) was added so that the amount of the aluminum atom became 230 mmol, and the resulting solution was subjected to ultrasonic irradiation at 23° C. for 15 minutes to give a catalyst solution.
Polymerization To a 15-liter autoclave vacuum dried and purged with nitrogen, 887 g of norbornene, 1,100 ml of styrene, 777 ml of cyclohexane and 3 ml of a cyclohexane solution of triisobutylaluminum (1 mmol/ml) were introduced at ambient temperature. The autoclave was pressurized up to 6 kg/cm$^2$-G with ethylene while stirring, and then the pressure was released. The operations of pressurizing and pressure release were repeated three times. Thereafter, the system was pressurized to 1.5 kg/cm$^2$-G with ethylene, and the temperature was raised to 70° C. The system was then pressurized with ethylene so that the internal pressure became 6 kg/cm$^2$-G. After stirring for 15 minutes, 13.7 ml of the catalyst solution previously prepared was added to the system to initiate copolymerization of ethylene and norbornene. With respect to the catalyst concentration at this time, the concentration of the isopropylidene-bis(indenyl) zirconium dichloride in the whole system was 0.0123 mmol/l, and the concentration of the methylaluminoxane in the whole system was 7.5 mmol/l. During the polymerization, ethylene was continuously fed to maintain the internal pressure at 6 kg/cm$^2$-G. After 60 minutes, isopropyl alcohol was added to terminate the polymerization reaction. After the pressure was released, the polymer solution was drawn out and washed with an aqueous solution of 5 ml of concentrated hydrochloric acid in 1 liter of water in a ratio between the polymer solution and the aqueous solution of 1:1, to transfer the catalyst residue into the aqueous phase. This contact mixed solution was allowed to stand, then the aqueous phase was removed by separation, and the remainder was further washed twice with distilled water to separate the polymerization liquid phase into an oil portion and an aqueous portion. The oil portion was brought into contact with acetone in an amount 3 times as much as the oil portion with vigorous stirring to precipitate a polymer and then sufficiently washed with acetone. The resulting solid portion (copolymer) was collected by filtration and dried at 130° C. and 350 mmHg for 12 hours in a stream of nitrogen. Thus, an ethylene/norbornene/styrene copolymer was obtained in a yield of 240 g, and the copolymer had an intrinsic viscosity [η], as measured in a decalin solvent at 135° C., of 0.8 dl/g, a glass transition temperature (Tg) of 142° C., a norbornene content of 41.1% by mol, a styrene content of 9.8% by mol and an activity of 6,500 g/mmol-Zr.

Using the cycloolefin copolymer obtained above, various properties were measured in the following manner. The results are set forth in Table 1.
Glass transition temperature The copolymer was measured on the glass transition temperature at a heating rate of 10° C./min by means of DSC manufactured by Seiko Electron Co.
Transparency (haze)

A sheet (thickness: 2 mm) prepared by compression molding of the copolymer at 250° C. was measured on the transparency (haze) by a hazeometer according to ASTM D 1003-52.
Birefringence A disc-shaped specimen (thickness: 1.2 mm, diameter: 12 cm φ) obtained by injection molding of the copolymer at a cylinder temperature of 300° C. and a mold temperature of 90° C. was measured on the birefringence in a system of measurement of He-Ne laser beam source→¼λ→specimen→polarizer→photo sensor. The measured value was expressed as retardation R (double pulse value).

Example 2

An ethylene/tetracyclododecene/styrene copolymer was obtained in the same manner as in Example 1, except that 887 g of tetracyclododecene was used in place of norbornene, the amount of styrene was varied to 500 ml, and the amount of cyclohexane was varied to 1,375 ml. The yield of the copolymer was 200 g, and the copolymer had an intrinsic viscosity [η], as measured in a decalin solvent at 135° C., of 0.7 dl/g, a glass transition temperature (Tg) of 135° C., a tetracyclododecene content of 34.2% by mol, a styrene content of 4.1% by mol and an activity of 5,400 g/mmol-Zr.

Using the cycloolefin copolymer obtained above, various properties were measured in the same manner as in Example 1. The results are set forth in Table 1.

Comparative Example 1

In a 2-liter glass polymerization reactor equipped with a stirring blade, copolymerization reaction of ethylene and 1,4,5,8-dimethano-1,2,3,4,4a,5,8,8a-octahydronaphthalene (referred to as "DMON" hereinafter) was continuously conducted in the following manner.

That is, to the polymerization reactor were continuously fed, through the upper part of the reactor, a toluene solution of DMON at a rate of 0.9 l/hr so that the DMON concentration in the reactor became 60 g/l, a toluene solution of $VO(OC_2H_5)Cl_2$ (as catalyst) at a rate of 0.7 l/hr so that the vanadium concentration in the reactor became 0.5 mmol/l and a toluene solution of $Al(C_2H_5)_{1.5}Cl_{1.5}$ (as catalyst) at a rate of 0.4 l/hr so that the aluminum concentration in the reactor became 2 nmol/l, while the polymerization solution was continuously drawn out from the lower part of the reactor so that the amount of the polymerization solution in the reactor was invariably 1 liter. To the polymerization reactor were further fed ethylene at a rate of 25 l/hr, $N_2$ at a rate of 80 l/hr and $H_2$ at a rate of 2 l/hr through the upper part of the reactor. The copolymerization reaction was carried out at 10° C. under temperature control using a cooling medium. To the polymerization solution continuously drawn out from the lower part of the reactor, a small amount of methanol was added to terminate the polymerization reaction. Then, the solution was introduced into a large amount of isopropyl alcohol to precipitate a copolymer produced, and the copolymer was washed with isopropyl alcohol. Thus, the copolymer was obtained at a rate of 30 g/hr. After the washing, the copolymer was dried at 100° C. under reduced pressure for one day and night.

The ethylene/DMON copolymer thus obtained had an intrinsic viscosity [η], as measured in a decalin solvent at 135° C., of 0.7 dl/g, a glass transition temperature (Tg) of 145° C. and a DMON content of 40% by mol.

Using the cycloolefin copolymer obtained above, various properties were measured in the same manner as in Example 1. The results are set forth in Table 1.

TABLE 1

| | Glass transition temperature (° C.) | Intrinsic viscosity (dl/g) | Haze (%) | Birefringence (nm) |
|---|---|---|---|---|
| Ex. 1 | 135 | 0.8 | 3.0 | 6 |
| Ex. 2 | 142 | 0.7 | 2.1 | 7 |
| Comp. Ex. 1 | 145 | 0.7 | 3.5 | 11 |

What is claimed is:

1. A cycloolefin copolymer which is obtained from:

(A) a straight-chain or branched α-olefin of 2 to 20 carbon atoms;

(B) a cycloolefin represented by the following formula (I) or (II)

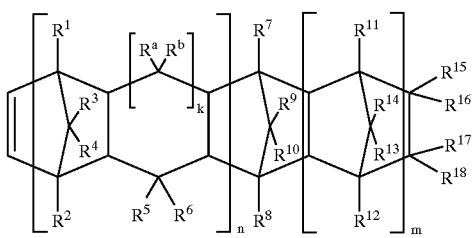

wherein n is 0 or 1; m is 0 or a positive integer; k is 0 or 1; $R^1$ to $R^{16}$, $R^a$ and $R^b$ are each independently a hydrogen atom, a halogen atom or a hydrocarbon group; $R^{15}$ to $R^{18}$ may be bonded to each other to form a monocyclic or polycyclic ring which may contain a double bond; and a combination of $R^{15}$ and $R^{16}$ or a combination of $R^{17}$ and $R^{18}$ may form an alkylidene group,

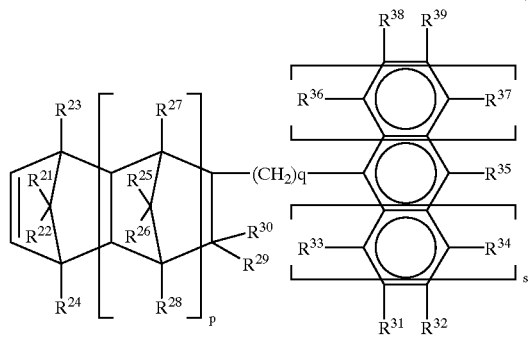

wherein p and q are each 0 or an integer of 1 or greater; r and s are each 0, 1 or 2; $R^{21}$ to $R^{39}$ are each independently a hydrogen atom, a halogen atom, an aliphatic hydrocarbon group, an alicyclic hydrocarbon group, an aromatic hydrocarbon group or an alkoxy group; a carbon atom to which $R^{29}$ and $R^{30}$ are bonded and either a carbon atom to which $R^{33}$ is bonded or a carbon atom to which $R^{31}$ is bonded may be bonded to each other directly or through an alkylene group of 1 to 3 carbon atoms; and in case of r=s=0, $R^{35}$ and $R^{32}$, or $R^{35}$ and $R^{39}$ may be bonded to each other to form a monocyclic or polycyclic aromatic ring; and (C) an aromatic vinyl compound;

wherein the cycloolefin copolymer has a glass transition temperature (Tg) of 60° C. to 170° C.; the intrinsic viscosity (η) of the cycloolefin copolymer is in the range of 0.1 to 10 dl/g;

the content of constituent units derived from the straight-chain or branched α-olefin (A) is in the range of 30 to 89% by mol; the content of constituent units derived from the cycloolefin (B) is in the range of 10 to 70% by mol; the content of constituent units derived from the aromatic vinyl compound (C) is in the range of 0.1 to 35% by mol; and the content (B (% by mol)) of the constituent units derived from the cycloolefin (B) and the content (C (% by mol)) of the constituent units derived from the aromatic vinyl compound (C) satisfy the following relation:

0.5×B≧C≧0.1×B.

2. A molded article comprising the cycloolefin copolymer as claimed in claim 1.

3. The molded article as claimed in claim 2, which is a molded article for optics.

* * * * *